United States Patent [19]

Maruyama et al.

[11] 4,415,320
[45] Nov. 15, 1983

[54] SLIDING VANE TYPE ROTARY COMPRESSOR

[75] Inventors: Teruo Maruyama, Neyagawa; Shinya Yamauchi, Katano; Shiro Yamamura, Kyoto; Yoshiyuki Morikawa, Otsu, all of Japan

[73] Assignee: Matsushita Electric Industrial Co., Ltd., Osaka, Japan

[21] Appl. No.: 283,041

[22] Filed: Jul. 13, 1981

[30] Foreign Application Priority Data

Sep. 25, 1980 [JP] Japan .................................. 55-13048

[51] Int. Cl.$^3$ .............................................. F04C 29/08
[52] U.S. Cl. ...................................... 418/150; 417/236; 417/259
[58] Field of Search ............... 418/150, 236, 237, 238, 418/259, 266, 268

[56] References Cited

U.S. PATENT DOCUMENTS 2,057,381 10/1936 Kenney ............................... 418/150
4,137,018 1/1979 Brucken ......................... 418/238 X Primary Examiner—Leonard E. Smith
Attorney, Agent, or Firm—Stevens, Davis, Miller & Mosher

[57] ABSTRACT

A sliding vane type rotary compressor having a rotor, at least one vane slidably mounted on the rotor, a cylinder accomodating the rotor and the vane, and end plates fixed to both ends of the cylinder so as to close vane chambers defined by the vane, the rotor and the cylinder at both sides of the vane chamber. The improvement comprises that the compressor is constructed to meet the following condition:

$$0.025 < \theta_s \bar{a}/V_o < 0.080$$

where, $\bar{a}$ is a value given by the following equation of:

$$\bar{a} = \int_o^{\theta_s} \theta^2 a(\theta) d\theta \Big/ \int_o^{\theta_s} \theta^2 d\theta$$

$\theta$ represents the angle (radian) formed around the center of rotation of the rotor between the end of the vane closer to the cylinder and the cylinder top where the distance between the inner peripheral surface of the cylinder and the outer peripheral surface of the rotor is smallest;

$\theta_s$ represents the rotation angle $\theta$ (radian) at the instant of completion of the suction stroke;

$V_o$ represents the volume (cc) of the vane chamber when the rotation angle $\theta$ is $\theta_s$; and $a(\theta)$ represents the effective area (cm$^2$) of the suction passage between an evaporator and the vane chamber. The refrigerating power is effectively suppressed in the high-speed operation without being accompanied by substantial reduction of refrigerating power in the low-speed operation.

3 Claims, 24 Drawing Figures

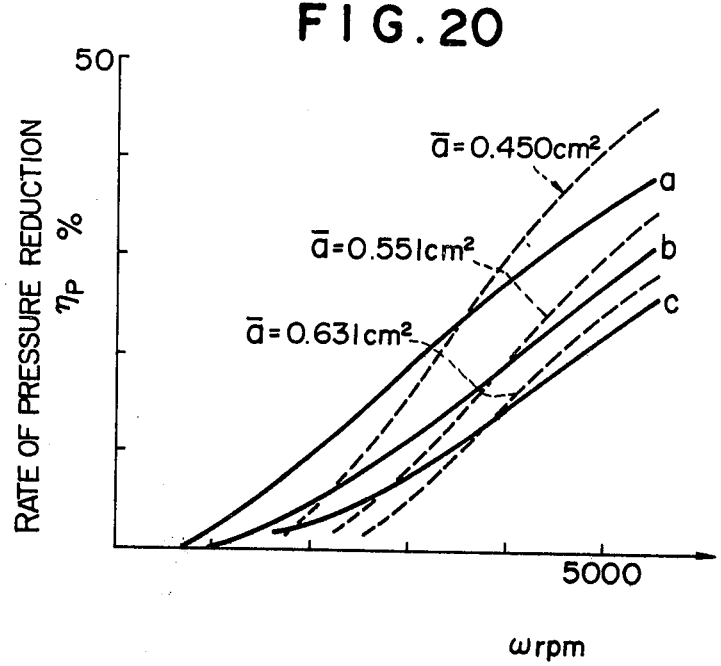
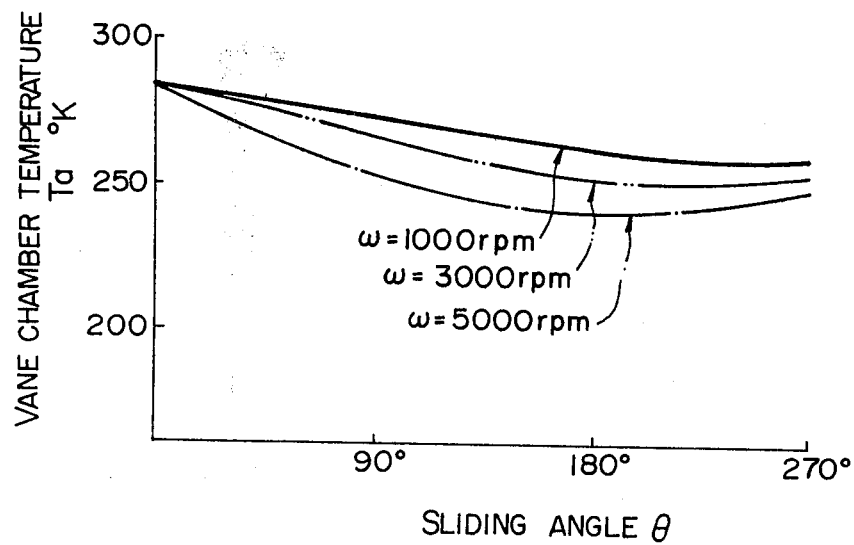

SLIDING VANE TYPE ROTARY COMPRESSOR

BACKGROUND OF THE INVENTION

The present invention relates to a rotary compressor of the sliding vane type and, more particularly, to a sliding vane type rotary compressor suitable for use as the compressor of a refrigerator incorporated in an air conditioning system for vehicles.

The sliding vane type rotary compressor has a small number of parts and is small-sized and of simple construction. Thanks to these advantages, the sliding vane type rotary compressor now has a spreading use as the refrigerating compressor for automobile air conditioning systems, in place of the conventional reciprocating compressors.

The sliding vane type compressor, however, has the following disadvantage as compared with the reciprocating compressors.

The sliding vane type rotary compressor for an automobile air conditioning system is adapted to be driven by the engine of the automobile through a belt which goes round a pulley coupled to a clutch connected to the rotary shaft of the compressor. Therefore, the refrigerating power of the air conditioning system incorporating the sliding vane type rotary compressor is increased substantially linearly in proportion to the increase of the engine speed.

In contrast, in the conventional reciprocating compressor, the suction valve cannot well follow-up the operation of the compressor when the operating speed is increased to a high level, so that the efficiency of the suction of refrigerant gas into the compressor is decreased to cause a saturation of the refrigerating power. In other words, in the case of the reciprocating compressor, the refrigerating power is automatically suppressed during high-speed running of the automobile. In the case of the rotary type compressor, however, such an automatic suppressing effect cannot be obtained so that the efficiency is lowered in accordance with the increment of the compression work or a state of overcooling occurs as the engine speed is increased.

In order to obviate the above-described problem of the prior art, it has been proposed to provide a control valve in the passage leading to the suction port of the rotary compressor adapted to vary the opening area in such a manner that the opening area is decreased as the engine speed is increased to cause some suction loss to automatically control the refrigerating power. This solution, however, is not preferred because the construction is complicated and the production cost is raised due to the provision of the control valve.

As another countermeasure for overcoming the problem of excessive refrigerating power, it has been proposed to use a fluid clutch, planetary gear or the like to drive the rotary compressor in such a manner that the speed of the compressor is not increased beyond a predetermined limit speed.

The use of the fluid clutch, however, poses a problem of a large energy loss due to generation of heat by friction-loss inherent to the clutch itself. Also, the use of the planetary gear mechanism, which is inevitably accompanied by an increase of the number of parts and increase of the size of the driving unit, is impractical in view of the current demand for simple and compact construction to meet the requirement for saving of energy.

SUMMARY OF THE INVENTION

It is, therefore, a major object of the invention to provide a sliding vane type rotary compressor suitable for use as the refrigerating compressor of an automobile air conditioning system capable of overcoming the above-described problems of the prior art.

The sliding vane type rotary compressor provided by the present invention can provide an optimum refrigerating effect even when the rotation speed of the driving side of the compressor is varied over a wide range and, accordingly, is suitable for use as the refrigerating compressor of an air conditioning system of, for example, automobiles.

More specifically, an object of the invention is to provide a sliding vane type rotary compressor suitable for use as the refrigerating compressor for an automobile air conditioning system, capable of meeting the following functions.

(1) Small loss of refrigerating power in low-speed operation and effective suppression of refrigerating power only in high-speed operation.

(2) Small loss of compression work and small driving torque.

(3) High reliability backed by the elimination of mechanical operating parts.

The present inventor has found out, through a minute study of the transient phenomenon of the pressure change in the vane chamber of the rotary compressor, that the self-suppressing control function similar to that of the conventional reciprocating compressor can be achieved also by the rotary compressor, by suitably selecting and combining various factors such as area of suction port, delivery rate, number of vanes and so forth.

Namely, by designing and constructing the rotary compressor in accordance with the conditions discovered by the present inventor, it is possible to create an effective pressure loss only in the high-speed operation, while minimizing the loss of suction pressure in the low-speed operation, even in the rotary compressor having no suction valve which is essential in the conventional reciprocating compressor.

Thus, according to the invention, it is possible to achieve an effective automatic refrigerating power control in an air conditioning system with existing simple rotary compressor, without necessitating any additional equipment.

The invention will be more fully understood from the following description of the preferred embodiments taken in conjunction with the accompanying drawings.

BRIEF DESCRIPTION OF THE DRAWINGS

FIGS. 5A and 5B show a suction port and a suction groove of the compressor shown in FIG. 2, in which FIG. 5B is a sectional view taken along the line VB—VB;

FIG. 20 is a graph showing the relationship between the rate of pressure reduction and the rotation speed; and FIG. 21 is a graph showing the relationship between the refrigerant temperature and the rotation angle of the vane.

DESCRIPTION OF THE PREFERRED EMBODIMENTS

Before turning to the detailed description of the preferred embodiments, a general description will be made as to a typical conventional sliding vane type rotary compressor for an automobile air conditioning system.

Figure 1:
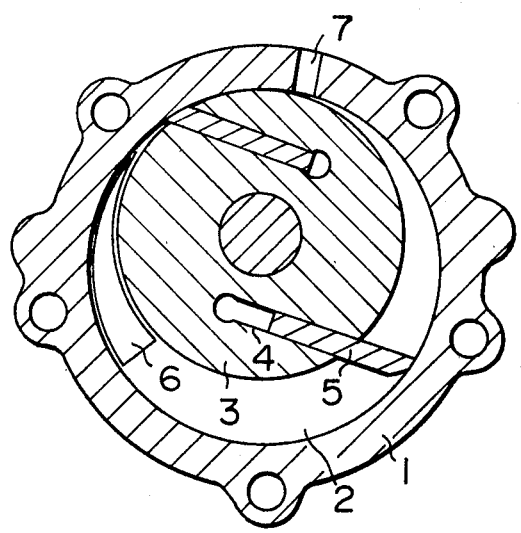
FIG. 1 is a front elevational sectional view of a conventional sliding vane type rotary compressor.

As will be seen from FIG. 1, a conventional sliding vane type rotary compressor has a cylinder 1 provided therein with a cylindrical space, end plates (omitted from FIG. 1) fixed to both ends of the cylinder 1 to close the vane chamber 2 defined in the cylinder 1, a rotor 3 disposed in the cylinder 1 at an eccentricity from the latter and vanes 5 slidably received by the grooves 4 formed in the rotor 3. Reference numerals 6 and 7 denote a suction port and a delivery port formed in the end plate and in the cylinder 7, respectively. As the rotor 3 rotates, the vanes 5 are projected radially outwardly by the centrifugal force to make a sliding contact at their ends with the inner peripheral surface of the cylinder 1 to prevent the leakage of the gas during operation of the compressor.

The embodiment of the invention will be described hereinunder on the following two cases:

[I] The case where the effective suction area is varied during suction stroke of the gas.

The case where the effective suction area is regarded as being constant during suction stroke will be described hereinunder as the first embodiment of the invention.

Figure 2:
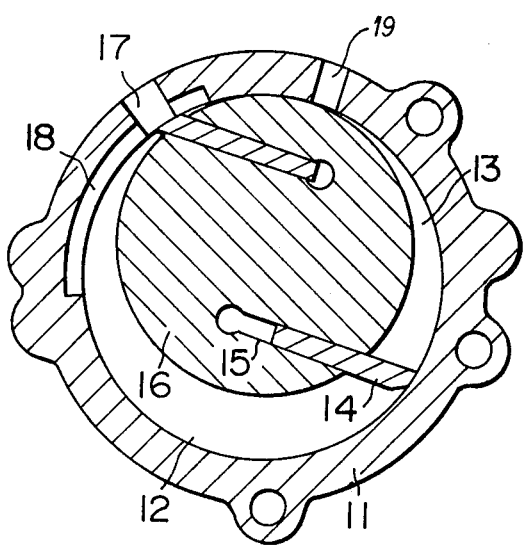
FIG. 2 is a front elevational sectional view of a sliding vane type rotary compressor constructed in accordance with a first embodiment of the invention.
Figure 3:
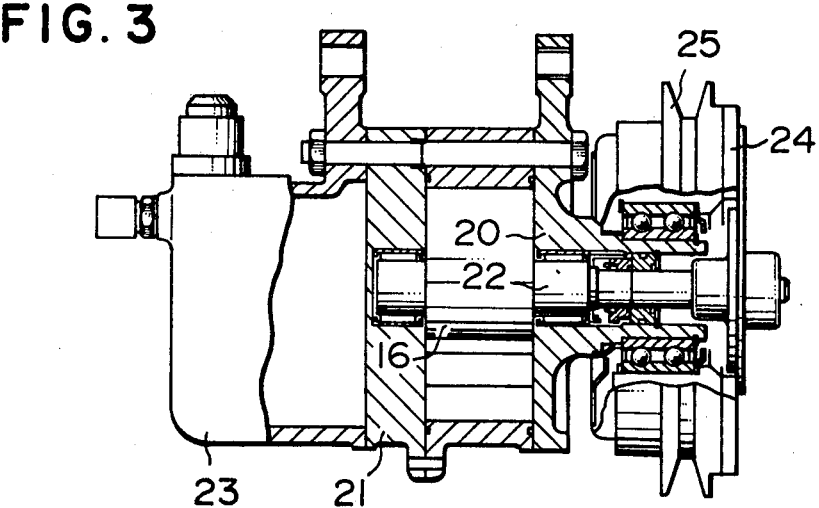
FIG. 3 is a sectional side elevational view of a portion of the compressor shown in FIG. 2.

FIGS. 2 and 3 are a front elevational sectional view and a side elevational view of a compressor constructed in accordance with the present invention.

Reference numeral 11 denotes a cylinder, 12 denotes a vane chamber of the low-pressure side, 13 denotes a vane chamber of the high-pressure side, 14 denotes vanes, 15 denotes vane grooves slidingly receiving the vanes, 16 denotes a rotor, 17 denotes a suction port, 18 denotes a suction groove formed in the inner peripheral surface of the cylinder 11, and 19 denotes a delivery port.

In FIG. 3, a reference numeral 20 denotes a front panel as the end plate, 21 denotes a rear panel, 22 denotes a rotary shaft, 23 denotes a rear case, 24 denotes a disc of the clutch fixed to the rotary shaft 22 and 25 denotes a pulley. The compressor of the first embodiment is constructed in accordance with the following condition.

TABLE 1

| Parameters | Symbol | Embodiment |
| --- | --- | --- |
| Number of vanes | n | 2 |
| Effective suction area | a | 0.450 cm$^2$ |
| Theoretical displacement | Vth | 86 cc/rev |
| Sliding angle of vane end for completing suction stroke | $\theta_s$ | 270° |
| Cylinder width | b | 40 mm |
| Cylinder inside dia. | Rc | 33 mm$^R$ |
| Rotor dia. | Rr | 26 mm$^R$ |

The sliding angle $\theta_s$ of vane end for completing suction stroke as appearing in Table 1 above is defined as follows.

Figure 4A:
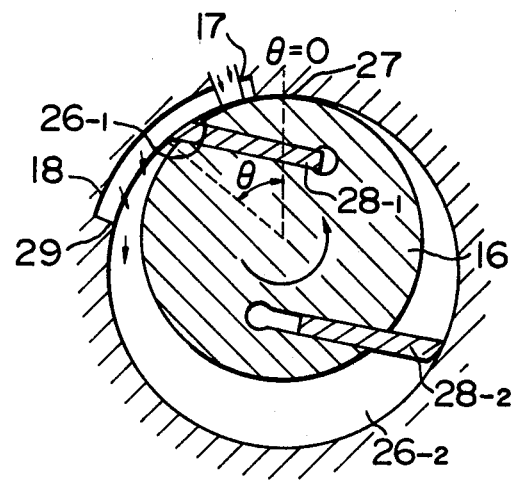
FIGS. 4A and 4B are front elevational sectional views showing the operation of the compressor shown in FIG. 2, in the states immediately after the commencement of the suction stroke and at the completion of the suction stroke.
Figure 4B:
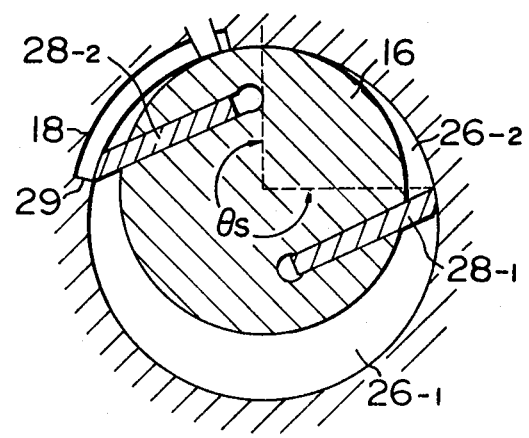

Referring to FIGS. 4A and 4B, a reference numeral 26-1 designates a first vane chamber, 26-2 denotes a second vane chamber, 27 denotes the top portion of the cylinder 11, 28-1 denotes a first vane, 28-2 denotes a second vane and 29 denotes the end of the suction groove. The position of the vane just passing the top portion 27 of the cylinder where the outer peripheral surface of the rotor 16 substantially contacts with the inner peripheral surface of the cylinder 1 is represented by $\theta = 0$, and the position of the end of the vane when the latter takes any angular position is represented by angle $\theta$ from the starting point $\theta = 0$ formed around the center of rotation of the rotor 16. Referring specifically to the first vane chamber 26-1, FIG. 4A shows the state in which the first vane 28-1 has just passed the suction port 17, i.e. the state immediately after the commencement of the suction stroke. In this state, the first vane chamber 26-1 receives the refrigerant directly through the suction port 17, while the second vane chamber 26-2 receives the refrigerant indirectly through the suction groove 18 as illustrated by arrows.

FIG. 4B shows the state in which the first vane chamber 26-1 has just completed the suction stroke, while the end of the second vane 28-2 is located on the end portion 29 of the suction groove. In this state, the first vane chamber 26-1 defined between the first and second vanes 28-1, 28-2 take the maximum volume.

Figure 5A:
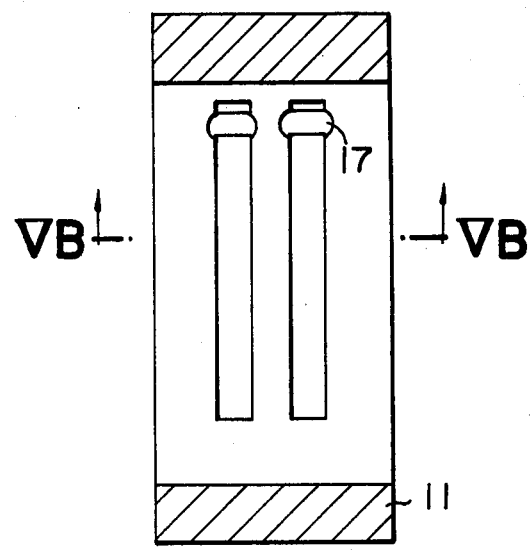
Figure 5B:
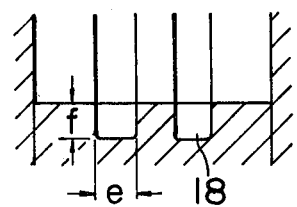

In the described embodiment, the suction grooves 18 are formed in the inner peripheral surface of the cylinder 11 in a manner as shown in FIGS. 5A and 5B. Each suction groove and each suction port are formed such that, when the end of the first vane 28-1 passes on the suction groove 18, the area of the suction port 17 is smaller than the cross-sectional area of any other part of the fluid passage between the suction port 17 and the second vane chamber 26-2.

Namely, referring to FIG. 5B, representing the area $S_1$ of suction groove by $S_1 = 2 \times e \times f$, the suction groove is formed in the wall of the cylinder to have a depth large enough to satisfy the condition of $S_1 > a$, refer to Table 1.

Figure 6:
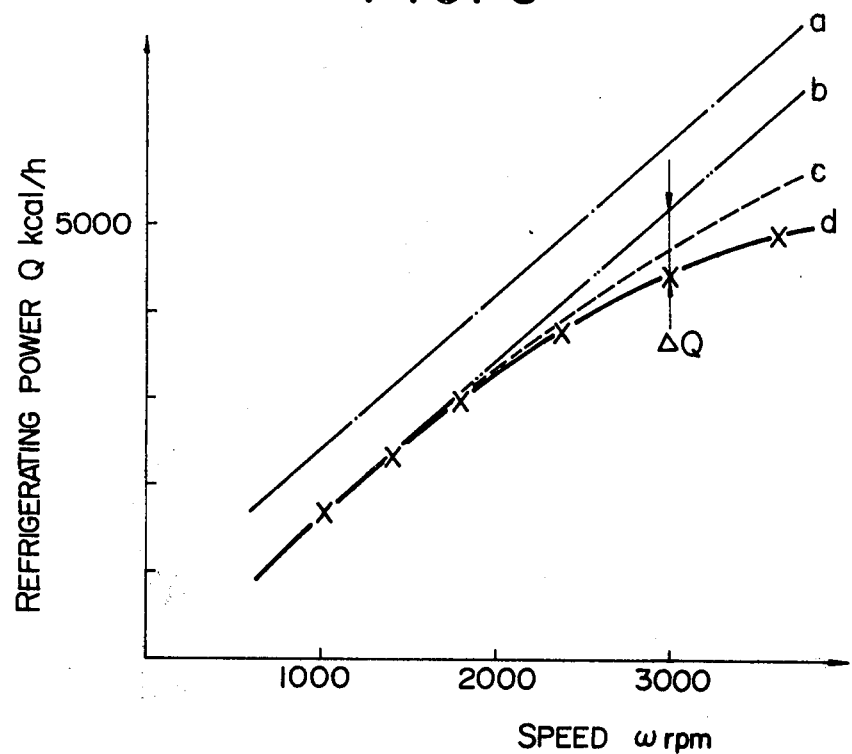
FIG. 6 is a graph showing the actually measured refrigerating power in relation to speed, in the compressor shown in FIG. 2 in comparison with that of the conventional compressor.

FIG. 6 shows the result of measurement of the refrigerating power in relation to speed of the compressor of the first embodiment constructed in accordance with the foregoing parameters. The measurement was conducted in accordance with the following condition, using a secondary refrigerant type calorimeter.

TABLE 2

| Parameter | Symbol | Embodiment |
|---|---|---|
| refrigerant press. at suction side | $P_s$ | 3.18 Kg/cm² abs |
| refrigerant temp. at suction side | $T_A$ | 283° K. |
| refrigerant press. at delivery side | $P_d$ | 15.51 Kg/cm² abs |
| speed | $\omega$ | 600 to 5000 rpm |

The characteristic curve a shows the refrigerating power determined by the theoretical displacement when there is no loss of refrigerating power, while the characteristic curve b shows the refrigerating power characteristic of an example of a conventional rotary compressor. The characteristic curves c and d show, respectively, the characteristic of an example of a conventional reciprocating compressor and the characteristic of the compressor constructed in accordance with the first embodiment of the invention.

Figure 7:
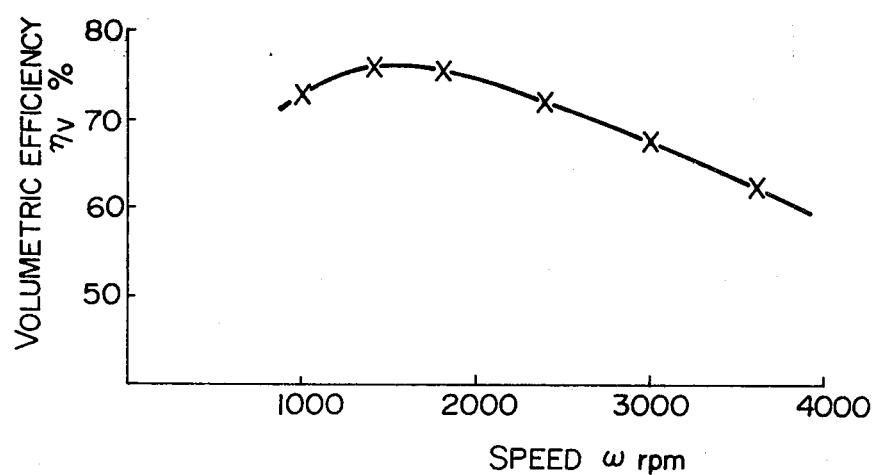
FIG. 7 is a graph showing the change of volumetric efficiency of the compressor shown in FIG. 2 in relation to speed as measured with the compressor shown in FIG. 2.

FIG. 7 shows the data concerning the volumetric efficiency $\eta_v$ as measured with the compressor of the first embodiment of the invention.

The compressor of this embodiment exhibits an ideal refrigerating power characteristic as shown in FIG. 6d. This goes quite contrary to the common sense that the rotary type compressor provides an excessive refrigerating power when operated at a high speed.

Namely, the following features (i) to (iii) were confirmed.

(i) The reduction of refrigerating power in low-speed operation was sufficiently small.

The characteristic curve in FIG. 7 shows a slight reduction of volumetric efficiency at a range of speed below 1400 rpm. This, however, is attributable to the leak of refrigerant at the sliding portion.

The reciprocating compressor having a function of self-controlling of the refrigerating power has a characteristic feature that the suction loss in the low-speed operation is small. The rotary compressor of the first embodiment of the invention showed a characteristic which well compares with that of the reciprocating compressor in the low-speed operation. It will be seen that the curves b and c well conforms with each other.

(ii) In the high-speed operation, the rotary compressor of the first embodiment showed an effect of suppression of refrigerating power which is equivalent to or higher than that achieved in the conventional reciprocating compressor.

(iii) The above-mentioned effect of suppressing the refrigerating power is obtained when the operation speed is increased above 1800 to 2000 rpm. Thus, the rotary compressor of the fist embodiment presents an ideal energy saving refrigeration cycle of good feeling suitable for use in the automobile air conditioning system.

The features (i) to (iii) mentioned above are ideal and quite advantageous when the compressor is used in the automobile air conditioning system.

It is remarkable that the first embodiment of the invention provides a sliding vane type rotary compressor having a satisfactory performance without necessitating any specific auxiliary equipment which is essential in the conventional rotary compressor.

Namely, according to the invention, it is possible to obtain a rotary compressor having a function of self-control of the refrigerating power, without deteriorating the advantages of the rotary compressor such as small size, light weight and simple construction.

Generally speaking, in the polytropic change in the suction stroke of the compressor, the total weight of the refrigerant in the vane chamber and, accordingly, the compression work are reduced as the suction pressure and, hence, the specific weight of the refrigerant are small. Therefore, in the compressor of the first embodiment in which the total weight of the refrigerant is reduced automatically before starting the compression stroke, the driving torque is naturally lowered in the high-speed operation.

Hitherto, in the case of the refrigerant cycle for a room air conditioner, such a power controlling system has been used as having a control valve connected between the high-pressure side and the low-pressure side of the compressor to relieve the compressed refrigerant from the high-pressure side to the low-pressure side to avoid excessive cooling. In such a system, however, the irreversible re-expansion of the refrigerant in the low pressure side causes compression loss which in turn results in a low efficiency of the compressor.

In the rotary compressor of the invention, however, it is possible to effect the control of the refrigerating power without requiring useless mechanical work which corresponds to the above-mentioned pressure loss, so as to obtain an energy-saving refrigeration cycle of high efficiency. As will be explained later, the invention is distinguishable in making an efficient use of the transient phenomenon of a pressure change in the vane chamber by a suitable combination of various parameters of the compressor, while eliminating any specific moving part such as the control valve. Therefore, the compressor of this invention can operate at a high efficiency.

In addition, since the refrigerating power changes gently in a stepless manner, the abrupt discontinuous change of the refrigerating characteristic as in the conventional refrigerating unit using a control valve, can be avoided so that a power control with a natural feeling is ensured.

Hereinafter, an explanation will be made as to the analysis of characteristics which have been made to minutely grasp the transient phenomenon of pressure change which is an essential factor of the invention.

The transient characteristic of the pressure change in the vane chamber can be expressed by the following energy equation (1).

$$\frac{Cp}{A} GT_A - Pa \frac{dVa}{dt} + \frac{dQ}{dt} = \frac{d}{dt}\left(\frac{Cv}{A} \gamma_a Va Ta\right) \quad (1)$$

In the equation (1) above, as well as in the following equations (2) to (4), the symbols represent the following factors:

G: weight flow rate of refrigerant, Va: volume of the vane chamber A: heat equivalent of work, Cp: specific heat at constant volume, Ta: suction side refrigerant temperature, $\kappa$: specific heat ratio, R: gas constant, Cv: specific heat at constant volume, Pa: pressure in vane chamber, Q: calorie, $\gamma_a$: specific weight of refrigerant in vane chamber, Ta: refrigerant temperature in vane chamber, a: effective area of suction port, g: gravity, $\gamma_A$: specific weight of refrigerant at suction side, $P_s$: refrigerant pressure at suction side.

In equation (1) above, the first term on the left side represents the thermal energy brought into the vane chamber through the suction port per unit time, while the second term represents the work done by the refrigerant per unit time. Also, the third term represents the thermal energy delivered per unit time from the outside through the wall of the compressor. The right member of the equation represents the increment of the internal energy of the whole system per unit time.

Assuming here that the refrigerant follows the Law of Perfect Gas, and that the suction stroke which is completed in a short time causes an adiabatic change of the gas, the following equation (2) is derived due to the conditions of $\gamma_a = Pa/RT_a$, $dQ/dt = 0$ $$G = \frac{dVa}{dt}\left(\frac{A}{CpT_A} + \frac{1}{\kappa RT_A}\right) Pa + \frac{Va}{\kappa RT_A} \frac{dPa}{dt} \quad (2)$$

Also, using the relationship expressed by $$\frac{1}{R} = \frac{A}{Cp} + \frac{1}{\kappa R},$$

the following equation (3) is derived.

$$G = \frac{1}{RT_A} \cdot \frac{dVa}{dt} \cdot Pa + \frac{Va}{\kappa RT_A} \frac{dPa}{dt} \quad (3)$$

The theory of nozzle is adaptable to the flow rate (weight) of the refrigerant passing through the suction port.

$$G = a\sqrt{2g\gamma_A Ps \frac{\kappa}{\kappa-1}\left[\left(\frac{Pa}{Ps}\right)^{\frac{2}{\kappa}} - \left(\frac{Pa}{Ps}\right)^{\frac{\kappa-1}{\kappa}}\right]} \quad (4)$$

The transient characteristic of the pressure Pa in the vane chamber is determined by solving the equations (3) and (4) in combination. Representing m by m=Rr/Rc, the volume Va($\theta$) of the vane chamber is given by the following equation (5)

$$V(\theta) = \frac{bRc^2}{2}\left\{(1-m^2)\theta + \frac{(1-m)^2}{2}\sin 2\theta - \right. \quad (5)$$

$$(1-m)\sin\theta \times \sqrt{1-(1-m)^2\sin^2\theta} - \sin^{-1}[(1-m)\sin\theta] +$$

$$\Delta V(\theta)$$

wherein, on condition of $0 < \theta < \pi$, Va($\theta$)=V($\theta$) and on condition of $\pi < \theta < \theta_s$, Va($\theta$)=V($\theta$)−v($\pi-\theta$).

Figure 8:
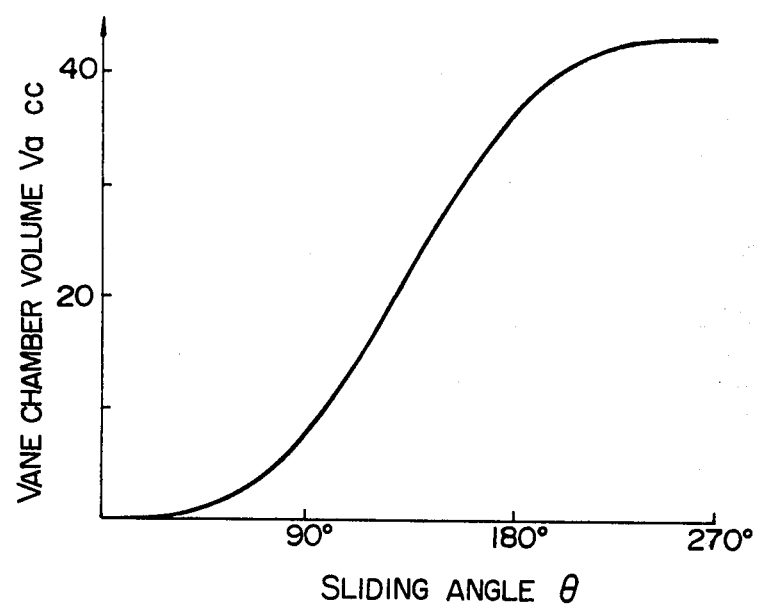
FIG. 8 is a graph showing the relationship between the volume of the vane chamber and the vane sliding angle in the compressor shown in FIG. 2.

The $\Delta V(\theta)$ is a compensation term for compensating for the eccentric arrangement of the vanes with respect to the center of the rotor, and is usually of an order of 1 to 2%. FIG. 8 shows the case where the compensation term $\Delta V(\theta)$ is zero.

Figure 9:
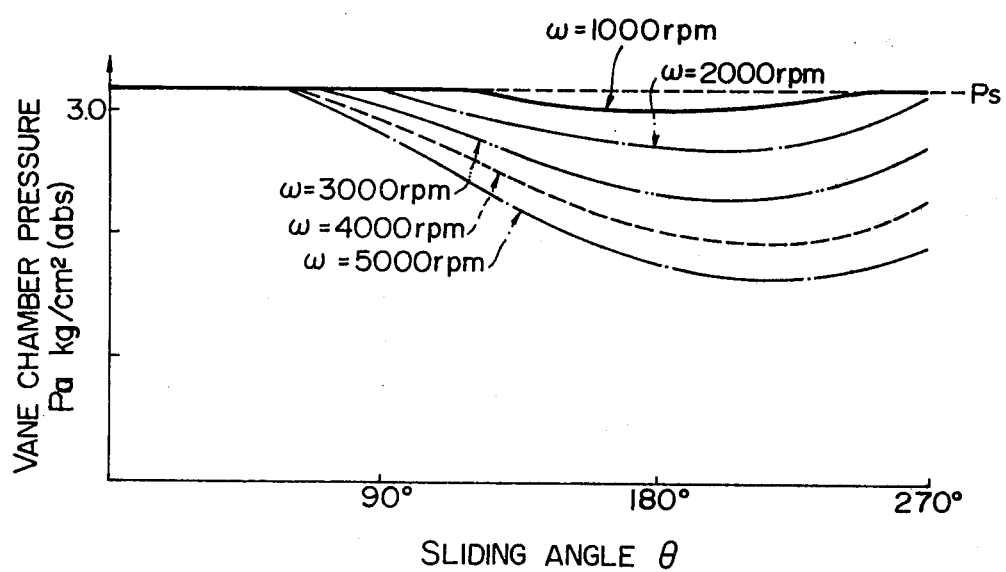
FIG. 9 is a graph showing the transient characteristic of the compressor shown in FIG. 2.

FIG. 9 shows the transient characteristic of the pressure in the vane chamber as obtained using the conditions shown in Tables 1 and 2, with an initial condition of t=0 and Pa=Ps, with a parameter of the rotation speed.

Usually, R-12 is used as the refrigerant in the refrigeration cycle of automobile air conditioning system. The analysis is made on condition of $\kappa=1.13$, R=668 Kg.cm/°K. Kg, $\gamma_A = 16.8 \times 10^{-6}$ Kg/cm$^3$ and $T_A = 283°$ K.

Referring to FIG. 9, the pressure Pa in the vane chamber has reached the suction pressure Ps=3.18 Kg/cm$^2$ abs, before the suction stroke is completed, i.e. at a position of $\theta=260°$, when the rotation speed is low ($\omega=1000$ rpm). Therefore, no loss of pressure in the vane chamber takes place when the suction stroke is completed.

As the rotation speed is increased, the supply of the refrigerant does not follow up the change of volume of the vane chamber, so that the pressure loss at the time of completion of the suction stroke ($\theta=270°$) is gradually increased. For instance, at the rotation speed of $\omega=4000$ rpm, the pressure loss $\Delta P$ in relation to the suction pressure Ps is 1.37 Kg/cm$^2$ to reduce the total weight of the sucked refrigerant, resulting in a remarkable reduction of the refrigerating power.

Instead of using the equation (5) from which the volume Va of the vane chamber can be obtained, we now propose the method of obtaining the correlation between the parameters and the efficiency of the performance capacity control by introducing the following approximation to the equations (3) and (4). Supposing that Vo is the maximum suction volume and using $\Psi = \Omega t = (\pi\omega/\theta_s)t$, the angle $\theta$ is transformed into $\Psi$, where $\Psi$ varies from 0 to $\pi$.

In consideration with the conditions, Va($\theta$)=0 and Va'($\theta$)=0 when t=0, and Va($\pi$)=Vo and Va'($\pi$)=0 when $t=\theta_s/\omega$ at which the suction stroke has been completed, the approximate function (6) is selected as for example:

$$Va(\Psi) = \frac{Vo}{2}(1 - \cos\Psi) \quad (6)$$

Representing $\eta$ by $\eta=Pa/Ps$, the following equation (7) is derived.

$$G = \frac{\Omega V_o}{2} \frac{P_s}{RT_A}\left(\sin\Psi \cdot \eta + \frac{1}{\kappa}(1-\cos\Psi)\frac{d\eta}{d\Psi}\right) \quad (7)$$

The equation (4) can be transformed into the following equation (8).

$$G = a\sqrt{P_s \cdot \gamma_A 2g \cdot \frac{\kappa}{\kappa-1}\left[\eta^{\frac{2}{\kappa}} - \eta^{\frac{\kappa+1}{\kappa}}\right]} \quad (8)$$

From the above equations (7) and (8), the following equation (9) is derived.

$$K_1 f(\eta) = \sin\Psi \cdot \eta + \frac{1}{\kappa}(1-\cos\Psi)\frac{d\eta}{d\Psi} \quad (9)$$

In the equation (9) above, $K_1$ is a dimensionless amount expressed by the following equation (10).

$$K_1 = \frac{2a\theta_s}{V_o\pi\omega} \cdot \sqrt{2gRT_A} \quad (10\text{-}1)$$

In the case of the sliding vane type rotary compressor, the theoretical displacement Vth is given by $V_{th} = n \times V_o$, where n represents the number of vanes, so that the equation (10) can be transformed into the following equation (11).

$$K_1 = \frac{2a\theta_s \cdot n}{V_{th}\pi\omega}\sqrt{2gRT_A} \quad (11)$$

In the equation (9) above, $\kappa$ is a constant which is determined by the kind of refrigerant. Therefore, under the condition of $K_1$ being constant, the solution of the equation (9), i.e. $\eta = \eta(\Psi)$ can be determined always directly.

This means that the loss of pressure in the vane chamber at the instant of completion of the suction stroke is equal for all compressors which are constructed to have an equal value of $K_1$, and the control of refrigerating power is effected at an equal rate with respect to a given refrigerating power Q Kcal which is obtained when no refrigerating power control is effected.

Representing the pressure in the vane chamber at the completion of suction stroke by $Pa = Pas$, the rate of reduction of pressure $\eta_p$ is defined as follows.

$$\eta_p = \left(1 - \frac{Pas}{Ps}\right) \times 100 \quad (12)$$

Now, a parameter $K_2$ which depends on the dimensions of the compressor, is introduced to evaluate the effect on the refrigerating power control of the compressor, and is defined by the following equation:

$$K_2 = \frac{a\theta_s}{V_o} \quad (10\text{-}2)$$

Figure 10:
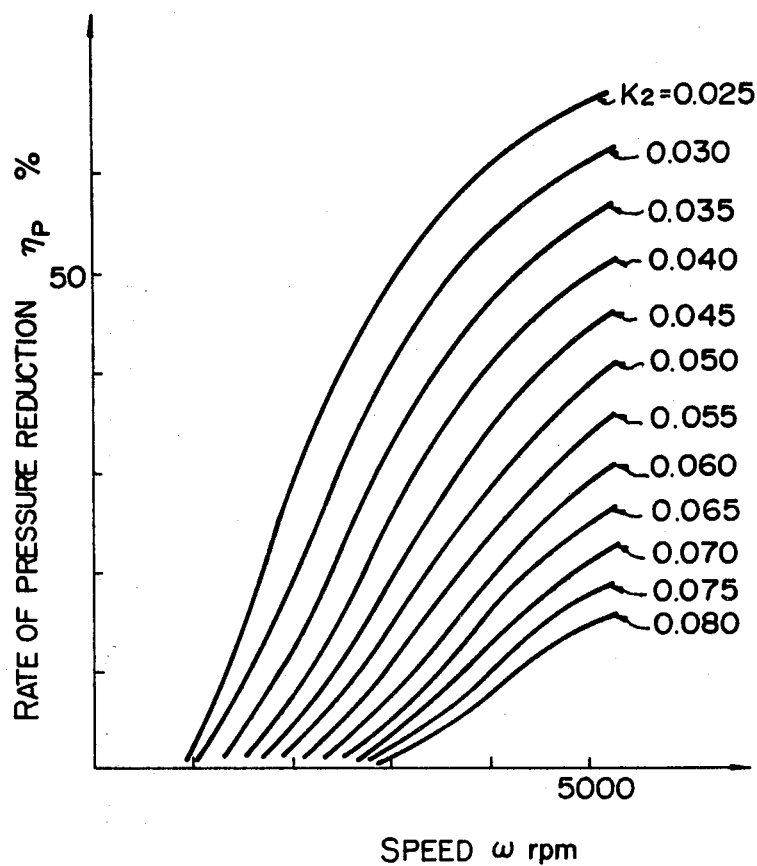
FIG. 10 is a graph showing the rate of pressure reduction in relation to the speed.

FIG. 10 shows a result which is obtained by the resolution to the equations (3) and (4) in combination under the condition of $T_A = 283$, giving $\Delta T = 10$ deg as a superheat, with using $K_2$ as a parameter.

As will be seen from FIG. 10, it is possible to effectively obtain a pressure loss only in the high-speed operation, while minimizing the pressure loss in the low-speed operation, by suitably selecting the parameters of the compressor. The pressure reduction characteristic in relation to the speed has a region which may be referred to as an "insensitive region". The presence of this insensitive region is the most important feature which permits a more efficient refrigerating power control in the rotary compressor of the invention.

The above-mentioned parameter $K_2$ is calculated in the embodiment shown in Table 1 as follows.

$$K_2 = \frac{0.450 \times 4.71}{43} = 0.0493$$

From FIG. 10, the rate of pressure reduction at the rotation speed of $\omega = 3000$ rpm, when the parameter $K_2$ takes the above-specified value, is determined to be $\eta_p = 15\%$. As will be explained later, the rate of pressure reduction can be considered as being materially identical to the rate of reduction of the refrigerating power. In the test result shown in FIG. 6, the rate of reduction of the refrigerating power is 16.0%. This well corresponds to the above-mentioned calculated value.

A test was conducted with a compressor mounted on an actual automobile. The test result showed that the refrigerating power controlling effect which provides a practically sufficient performance of the automobile air conditioning system is, for example, as follows. (1) The rate of reduction of refrigerating power (pressure loss) is less than 5% at speed of $\omega = 1800$ rpm. (2) The rate of reduction of refrigerating power at speed of $\omega = 3600$ rpm is less than 10%.

The range of the parameter $K_2$ which meet both of the above conditions (1) and (2) is given as follows.

$$0.040 < K_2 < 0.075 \quad (13)$$

Thus, by selecting the parameters a, $\theta_s$, n and Vth of the compressor to meet the above-equation (13), it is possible to obtain a compressor having a function of self-controlling of the refrigerating power and fulfilling the conditions (1) and (2) stated above. It is to be noted, however, the equation (13) is based on the value of $K_2$ obtained on the assumption that the refrigerant temperature $T_A$ is 283° K., so that the range specified by the equation (13) may be somewhat changed depending on the selection of the temperature $T_A$.

When freon R-12 is used as the refrigerant of the refrigerating cycle of automobile air conditioning system, the evaporation temperature $T_A$ of the refrigerant is determined taking the following points into account.

The refrigerant temperature $T_A$ is preferably low, because the rate of heat exchange in the evaporator becomes larger as the temperature difference between the ambient temperature and the circulated refrigerant becomes greater. However, when the refrigerant temperature is lowered down below the freezing point of moisture in the air, the moisture is frozen around the refrigerant pipes to undesirably lower the heat exchanging efficiency. It is, therefore, preferred to construct the refrigeration cycle such that the refrigerant temperature is maintained higher than the above-mentioned freezing point. In the case where there is a flow of air, a refrigerant temperature around $T_A = -5°$ C. is optimum, and the practically allowable limit of the refrigerant temperature $T_A$ is $-10°$ C. The evaporation temperature of the refrigerant becomes higher during low-speed running or the idling of the engine in which the condition for heat exchange is not good. The rate of heat exchange may be increased by increasing the flow rate of air provided by the blower or by increasing the surface area of the evaporator. These solutions, however, have a practical limit in mounting the air conditioning system on the automobile.

Therefore, the practical upper limit of the refrigerant temperature is $T_A = 10°$ C. The refrigerant temperature is maintained, more preferably, less than 5° C.

Therefore, in order to construct a practically acceptable refrigeration cycle, it is necessary that the following condition be met.

$$-10°\ C. < T_A < 10°\ C. \tag{14}$$

As a point of information, the refrigerant suction pressure in this state is given by the following equation (15).

$$2.26\ kg/cm^2\ abs < P_s < 4.26\ kg/cm^2\ abs \tag{15}$$

Taking the superheat $\Delta T = 10$ deg. into account, the equation (14) can be reformed as follows.

$$0°\ C. < T_A < 20°\ C. \tag{16}$$

Therefore, it is possible to correct the range of the parameter $K_2$ determined by the equation (13), using the equation (16). Thus, only a 1.8% increase of the upper limit value and 1.7% reduction of the lower limit value are the necessary correction.

The "effective suction area" as referred to in the present invention has the following meaning.

If there is any portion of minimum cross-section in the fluid passage between the outlet side of the evaporator and the vane chamber of the compressor, it is possible to grasp the approximate value of the effective suction area a as the product of the minimum cross-section and the flow contraction coefficient C which is usually 0.7 to 0.9. In a strict sense, however, the value obtained through the following experiment following JIS B 8320 or the like rule is defined as the effective suction area a.

Figure 11:
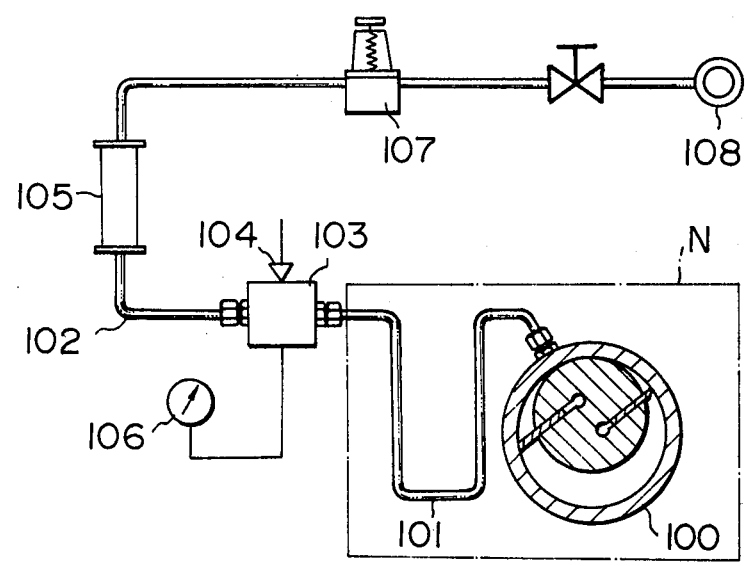
FIG. 11 is a schematic illustration of an apparatus for actually measuring the effective suction area of the compressor.

FIG. 11 illustrates an example of such an experiment. In FIG. 11, a reference numeral 100 designates a compressor, 101 denotes a pipe interconnecting the evaporator and the suction port of the compressor when the air conditioning system is actually mounted on an automobile, 102 denotes a pipe for supplying a pressurized air, 103 denotes a housing for providing a communication between the pipes 101 and 102, 104 denotes a thermocouple, 105 denotes a flowmeter, 106 denotes a pressure gauge, 107 denotes a pressure regulating valve and 108 denotes the source of the pressurized air.

In FIG. 11, the compressor to which the present invention pertains is encircled by a chain line N. In the testing apparatus shown in FIG. 11, if there is any restriction which imposes an inneglibibly high resistance in the evaporator, it is necessary to provide a restriction corresponding to that of the evaporator in the pipe 101.

For measuring the effective suction area a of the compressor having a construction as shown in FIG. 3, the experiment is conducted with the front panel 20 demounted from the cylinder 11, after removal of the disc and the pulley 24, 25 of the clutch.

Representing the pressure of the pressurized air by $P_1$ Kg/cm², and assuming that the atmospheric pressure $P_2$, specific heat ratio $\kappa_1$ of air, specific weight of air and gravity g are 1.03 Kg/cm² abs, 1.4 $\gamma_1$ and 980 cm/sec², respectively, while representing the flow rate (weight) by $G_1$, the effective suction area a is determined in accordance with the following equation (17).

$$a = G_1 / \sqrt{2g\gamma_1 P_1 \frac{\kappa_1}{\kappa_1 - 1} \left\{ \left(\frac{P_2}{P_1}\right)^{\frac{2}{\kappa_1}} - \left(\frac{P_2}{P_1}\right)^{\frac{\kappa_1+1}{\kappa_1}} \right\}} \tag{17}$$

The high pressure $P_1$ is determined to meet the condition of $0.528 < P_2/P_1 < 0.9$.

The following table 3 shows the result of test conducted with compressors having different values of the parameter $K_2$, mounted on actual automobiles.

TABLE 3

| rev. speed | effect of power control | $K_2$ | test result |
|---|---|---|---|
| 1800 rpm | 22.5% | 0.025 | Efficiency at low speed is somewhat lowered but sufficient refrigerating power confirmed provided that compressor having Vth in excess of 95 cc/rev is used |
| | 9.0 | 0.035 | Slight loss of efficiency observed but practically usable |
| | 4.5 | 0.040 | Reduction of efficiency is very small. It is possible to construct ideal energy saving refrigeration cycle having high efficiency |
| 4600 | 21.5 | 0.065 | Best control of power at high-speed operation and best energy-saving effect obtained. |
| | 18.0 | 0.070 | Effect equivalent to that of conventional reciprocating compressor obtained. Practically sufficient |
| | 12.0 | 0.080 | Power controlling effect somewhat insufficient. Provided that the engine displacement is in excess of 2000 cc, a practically usable refrigeration cycle can be designed with the use of a condenser having a large capacity. |

The data shown in FIG. 6 were obtained with constant suction and delivery pressures $P_s$, $P_d$. In the actual running of the automobile, however, the suction pressure is reduced and the delivery temperature is raised during high speed operation of the compressor. In consequence, assuming that no control of the refrigerating power is effected, the compression ratio is increased not only to increase the compression work (driving torque) but also an overload of the condenser due to the elevated delivery temperature, resulting, in the worst case, a breakdown in the cooler. The margin to the overload is increased as the size of the condenser becomes large. Therefore, a sufficiently large margin for the excessive refrigerating power is preserved as the size of the automobile becomes large, because it is possible to mount a condenser having a larger size.

From the test result shown in Table 3, it is derived, taking into account the selection of class of the automobile having different engine displacements, that the present invention can be practically carried out when the parameter $K_2$ falls within the range specified below.

$$0.025 < K_2 < 0.080$$

A first embodiment has been described hereinbefore on an assumption that the effective area of the passage leading to the vane chamber is regarded as being constant over the whole part of the suction stroke. The theoretical explanation using the parameters $K_1$ and $K_2$, however, does not apply when the opening of the suction passage to the vane chamber has a substantial length in the direction of running of the vane to vary the effective area of the opening depending on the position of the vane. This is because, in the relationship expressed by the equation (9), the parameter $K_1$ changes as a function of $\psi$ to vary the value of $\eta$ in accordance with $K_1(\psi)$ within the region of $0 < \psi < \pi$.

For instance, in the case where the compressor has the suction port 6 in the rear end plate as in the case of the compressor shown in FIG. 1, the effective area of opening of the suction passage is gradually decreased in the final part of the suction stroke in which the vane 5 passes over the suction port 6.

Hereinafter, a description will be made as to the second embodiment of the invention which applies to the case where the effective suction area is changed during the suction stroke of the compressor.

Figure 12:
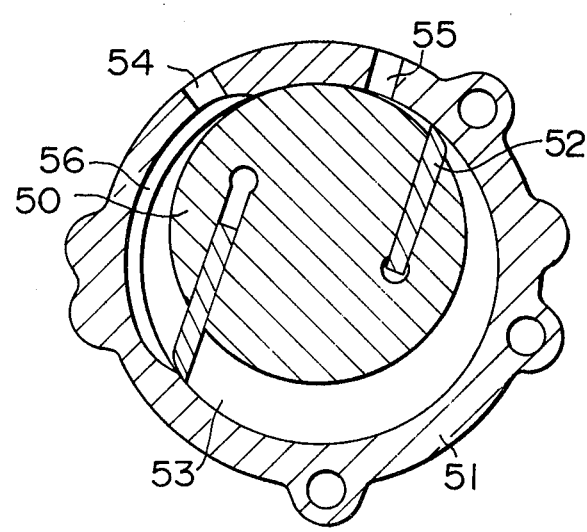
FIG. 12 is a front elevational sectional view of a slide vane type rotary compressor constructed in accordance with a second embodiment of the invention.

Referring to FIG. 12, the compressor has a suction groove 56 and a suction port 54 formed in the inner peripheral surface of the cylinder. The effective suction area $S_1$ determined by the width e, depth f and the number of the suction grooves is selected to be somewhat smaller than the aforementioned suction port 54. In this case, the effective area of the suction passage is reduced in the later part of the suction stroke. (As to the symbols e and f, refer to FIG. 5)

Referring to FIG. 12, a reference numeral 50 denotes a rotor, 51 denotes a cylinder, 52 denotes vanes, 53 denotes a vane chamber, 54 denotes a suction port, 55 denotes a delivery port and 56 denotes a suction groove.

The shape of the suction groove as illustrated in FIG. 12, if it is acceptable in view of the characteristics of the compressor, is advantageous from the view point of mass production of the compressor, because such a shape affords a curvature of the profile of the groove corresponding to the diameter of the tool.

Thus, in ordinary compressors, the effective suction area is often changed largely in the suction stroke, due to the reason in the processing or general arrangement. The second embodiment of the invention described hereinafter can apply to such a type of compressor.

(i) In the case where the suction passage is closed in the earlier part of the suction stroke:

A discussion will be made hereinunder as to the influence of the closing of suction passage in the earlier half part of the suction stroke, i.e. the stop of supply of refrigerant to the vane chamber, on final pressure of the refrigerant.

To investigate this influence, a numerical experiment was conducted as follows on an assumption that the rotation speed $\omega$ is 3600 rpm, with the parameters other than the effective suction area $a(\theta)$ of equation (10) set at the same values as those in Tables 1 and 2.

Figure 13A:
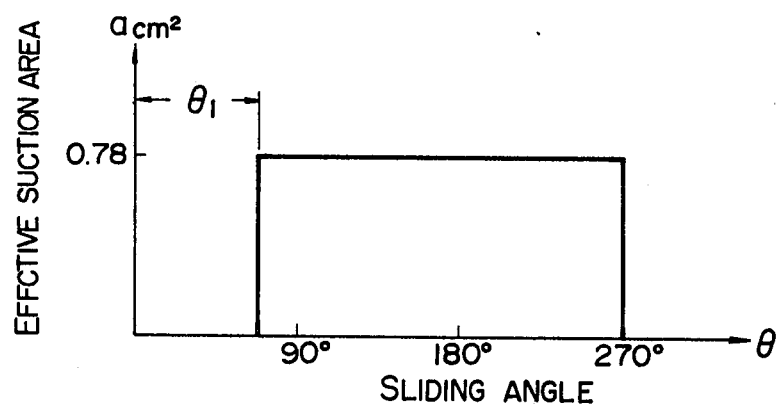
FIGS. 13A and 13B shows the relationship between the vane rotating angle and the effective suction area in the sliding vane type rotary compressor shown in FIG. 12 in the case where the suction passage is closed in the earlier part of the suction stroke and in the case where the suction passage is closed in the later part of the suction stroke, respectively.
Figure 13B:
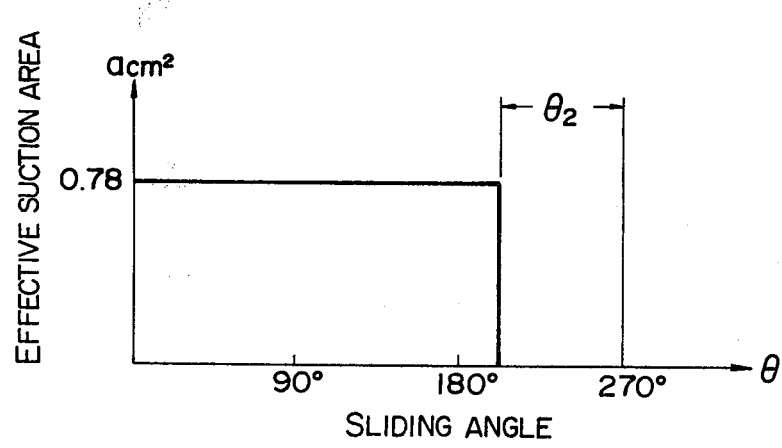
Figure 14:
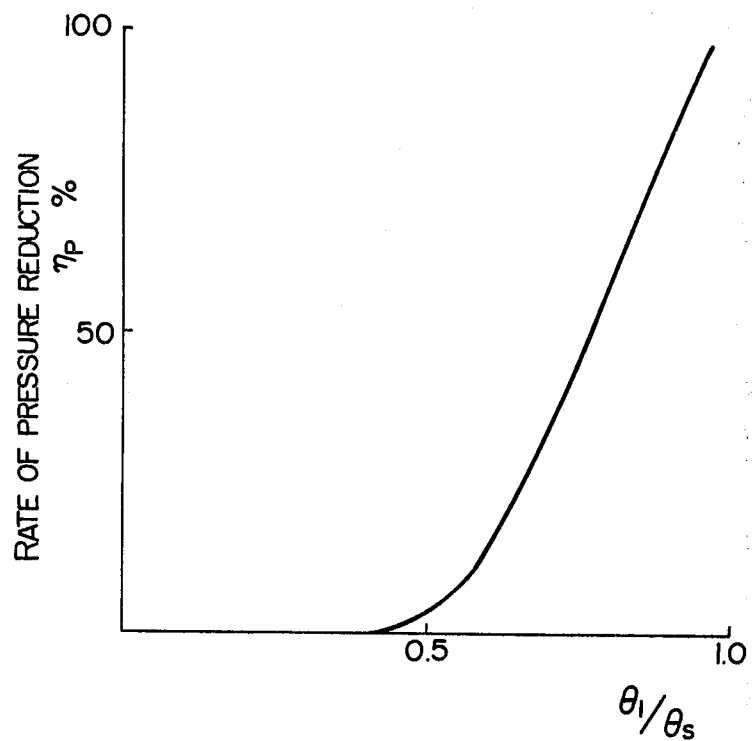
FIG. 14 is a graph showing the rate of pressure reduction in relation to the ratio $\theta_1/\theta_s$ between the rotation angle $\theta_1$ of the vane in the region in which the suction passage of 13a is closed and the sliding angle $\theta_s$ of the vane over the region of the suction groove.

Representing the region in which the suction passage shown in FIG. 13A is closed (region of $a(\theta)=0$) by $\theta_1$, the rate of pressure reduction $\theta_p$ was obtained in relation to $\theta_1/\theta_s$, the result of which is shown at FIG. 14.

From FIG. 14, it will be seen that the presence or absence of the suction passage does not affect the final pressure materially, when the ratio $\theta_1/\theta_s$ falls within the range expressed by $0 < \theta_1/\theta_s < 0.5$. Namely, the rate of pressure drop $\eta_p$ at the instant of completion of the suction stroke is ruled solely by the area of the suction port $a(\theta) = 0.78$ cm$^2$ which opens in the later half part of the suction stroke, and has no relation to the state of the suction passage in the earlier half part of the suction stroke.

Figure 15:
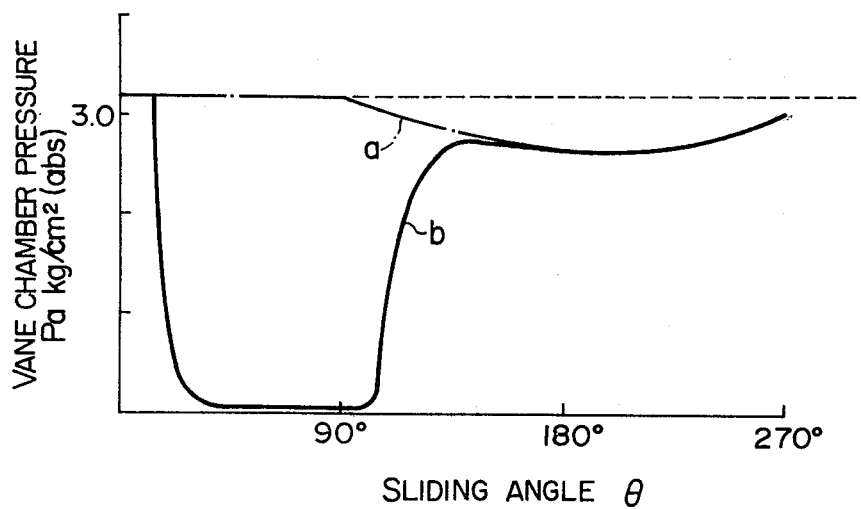
FIG. 15 is a graph showing the transient characteristic of pressure in the vane chamber.

FIG. 15 shows the transient characteristics which are the practical examples of the above-described result. More specifically, the characteristic a is obtained when the suction area is maintained constant over the whole part of the suction stroke, while the characteristic b is obtained when the suction passage is closed over the period of $0 < \theta/\theta_s < 0.37$.

In the case of the characteristic b, the pressure Pa in the vane chamber is largely decreased while the suction passage is kept closed, but is increased abruptly as the passage is opened. No substantial difference is found between the values of characteristic curves a and b at the instant $\theta_s = 270°$ at which the suction stroke is completed.

Figure 16:
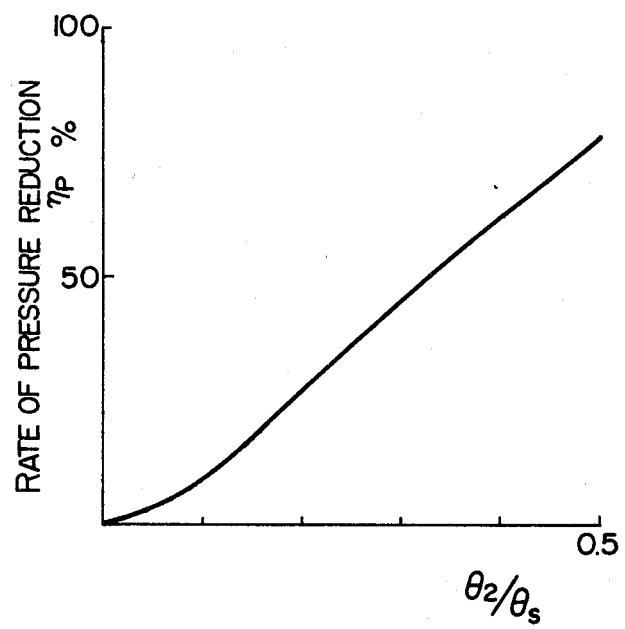
FIG. 16 is a graph showing the rate of pressure reduction in relation to the ratio $\theta_2/\theta_s$ between the rotation angle $\theta_2$ of the vane over the region in which the suction passage shown in FIG. 13B is closed and the rotation angle $\theta_s$ of the vane over the region of the suction groove.

(ii) In the case where the suction passage is closed in the later part of the suction stroke:

FIG. 16 shows how the final refrigerant pressure is affected when the suction passage is closed over an angular range $\theta_2$ in the later half part of the suction stroke. It will be seen that the rate of pressure reduction $\eta_p$ is increased in proportion to the angular range $\theta_2$. In fact, the rate of pressure reduction $\eta_p$ is about 80% or higher when the ratio $\theta_2/\theta_s$ is 0.5.

The following fact is derived from the above considerations (i) and (ii).

The influence of the opening state of the suction passage and the size of the opening of the suction passage upon the final refrigerant pressure varies largely depending on the angle $\theta$ of running of the vane in the suction stroke. The influence is small in the earlier half part of the suction stroke, i.e. in the region of $0 < \theta < \theta_s/2$, but is gradually increased as the angle $\theta$ approaches $\theta_3$.

The above-described fact tells that, it is possible to obtain an adequate mean value $a(\theta)$ of any desired function $a(\theta)$, by providing the area $a(\theta)$ of the suction passage with "weight" in accordance with the position.

Figure 17:
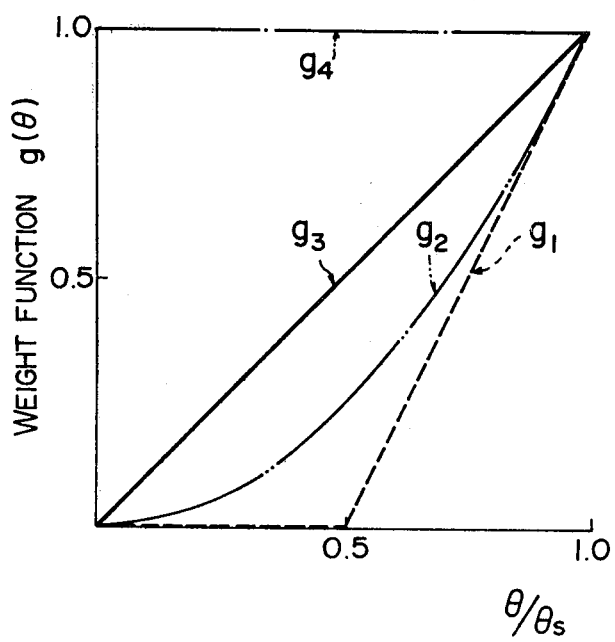
FIG. 17 is an illustration of a weight function.

FIG. 17 shows various weight functions $g(\theta)$. In the function $g_1$, $g(\theta) = 0$ on condition $0 < \theta/\theta_s < 0.5$ and $g(\theta) = 2(\theta/\theta_s) - 1$ on condition of $0.5 < \theta/\theta_s < 1$. The function $g_2$ is $g(\theta) = (\theta/\theta_s)^2$, the function $g_3$ is $g(\theta) = \theta/\theta_s$ and the function $g_4$ is $g(\theta) = 1$.

The weight mean $\bar{a}$ is defined here as follows.

$$\bar{a} = \int_0^{\theta_s} g(\theta) \cdot a(\theta) d\theta / \int_0^{\theta_s} g(\theta) d\theta \qquad (18)$$

The mean value $\bar{a}$ of $a(\theta)$ was obtained from the $a(\theta)$ as the function of vane sliding angle $\theta$ and from various weight functions $g(\theta)$. From the thus obtained mean value $\bar{a}$, the transient characterisic at an operation speed of 3600 rpm was obtained using the equations (3) and (4), as well as conditions specified in Tables 1 and 2 (except the area a), the result of which is shown at shown in FIG. 17.

Figure 19:
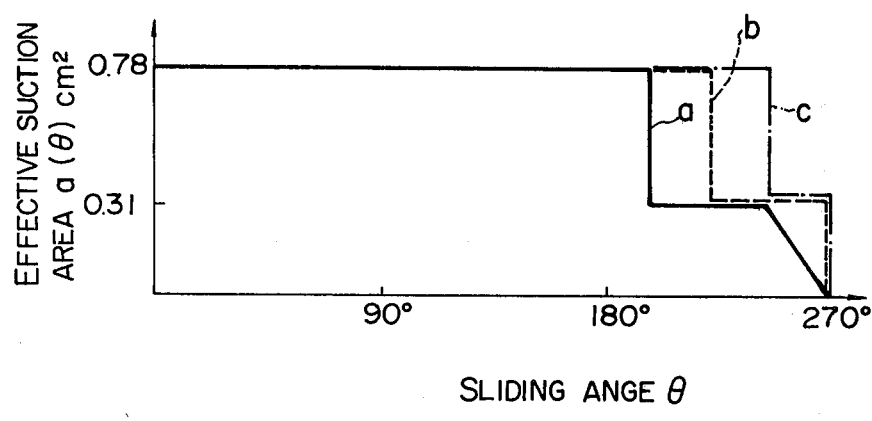
FIG. 19 is a graph showing the effective suction area in relation to the vane rotation angle.

The value of the area a as shown in FIG. 19 is used as the area a(θ) of the suction passage. The pa(θ) shown in this Figure is a strict answer as obtained without using the mean value. The term "strict answer" used here means the value obtained through a numerical analysis precisely taking the suction area a(θ) into account but does not mean any analytically determined value.

TABLE 4

| weight function | weight mean ā | error from strict answer |
|---|---|---|
| g1 | 0.365 cm² | −9.4% |
| g2 | 0.450 | 0.3 |
| g3 | 0.530 | 7.9 |
| g4 | 0.630 | 17.3 |

Figure 18:
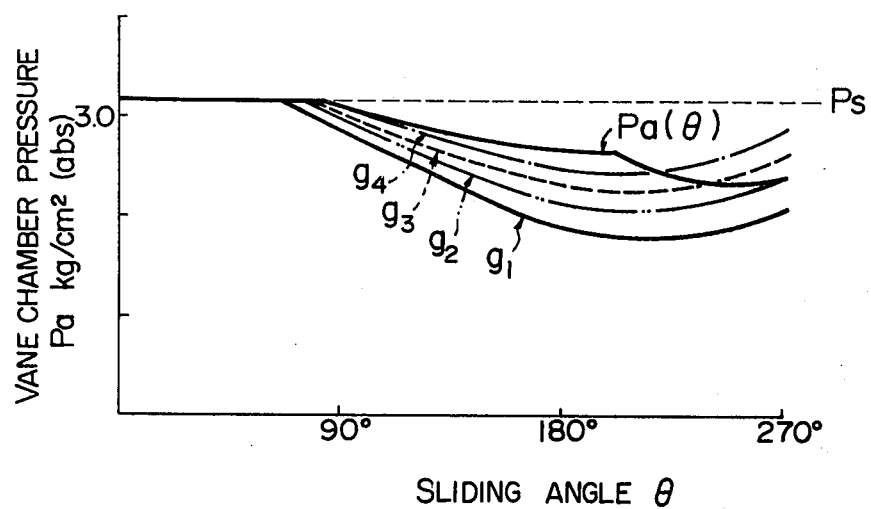
FIG. 18 is a graph showing the transient characteristic of pressure in the vane chamber.

According to the result shown in FIG. 18, the strict answer Pa(θ) exhibits a pressure loss of ΔP=0.78 Kg/cm² abs with respect to the suction pressure Ps=3.18 Kg/cm² abs, at the instant θ=270° at which the suction stroke is completed.

The pressure Pa(θ) according to the strict answer starts again to decrease at an instant $\theta_{s1}=200°$. This is attributable to the fact that the effective area of the suction passage is reduced from a(θ)=0.78 cm² down to 0.31 cm².

The errors of the values obtained with various weight functions from the strict answer are shown in Table 4.

From FIG. 18, it will be seen that, when the weight function g1 is used, the value obtained with the use of the weight mean is somewhat smaller than the value of the strict answer. To the contrary, when the weight function g2 is used, the value obtained with the use of weight mean is somewhat greater than that of the strict answer. Since there is a relation expressed by $g_1<g_2<g_3$, the function $g(\theta)=g_2=(\theta/\theta_s)^2$ provides the optimum effect under the condition explained above. Thus, substituting $g(\theta)=g_2=(\theta/\theta_s)^2$ into Equation (18) and noting that $\theta_s$ is constant, the following equation is obtained:

$$\bar{a} = \int_o^{\theta_s} \theta^2 a(\theta)d\theta / \int_o^{\theta_s} \theta^2 d\theta \quad (18a)$$

FIG. 19 shows the relationship between the effective suction area a(θ) in relation to the rotation angle θ of the vane in the compressor having the suction groove of the shape shown in FIG. 12, for each of the three cases (a), (b) and (c) as shown in Table 5 below.

TABLE 5

| | angle at which effective area is changed | | effective area ā obtained using weight function g2 |
|---|---|---|---|
| | $\theta_{s1}$ | $\theta_{s2}$ | ā |
| a | 200° | 250° | 0.450 cm² |
| b | 220° | 270° | 0.551 cm² |
| c | 240° | 270° | 0.631 cm² |

FIG. 20 shows, for each of the cases (a), (b) and (c), the rate of pressure reduction in relation to speed as obtained by the strict answer in comparison with that obtained by the use of the weight mean a.

In each case, both characteristics well match to each other at a speed range of between ω=3000 rpm and ω=4000 rpm. The gradient of rate of pressure reduction in relation to rotation speed is more gentle in the case of the strict answer than in the case of the weight mean. Therefore, in the region of a comparatively high rotation speed, a larger rate of pressure reduction is obtained when the weight mean a is used, whereas, in the region of comparatively low speed, a greater rate of pressure reduction is obtained by the use of the strict answer.

From these results, it will be seen that, within the range in which the parameter K2 can be selected suitably, the effective suction area is preferably maintained constant rather than being decreased gradually during the suction stroke, in order to achieve an ideal refrigerating power controlling characteristic.

The above-described method using the weight mean can provide an approximation of a practically sufficient accuracy, so that it is possible to evaluate the characteristic employing the parameter K2 as in the case of the [I] stated before.

To sum up, the present invention can be applied in the following manner to an ordinary compressor in which the effective suction area of the suction passage is changed during the suction stroke.

(1) To obtain the effective area a(θ) of the passage between the evaporator and the vane chamber of the compressor within the range of $0<\theta<\theta_s$.

(2) To determine the weight mean ā using the effective area a(θ) as determined above, making use of the following equation.

$$\bar{a} = \int_o^{\theta_s} \theta^2 a(\theta)d\theta / \int_o^{\theta_s} \theta^2 d\theta$$

(3) To determine the parameter $K_2=\bar{a}.\theta_s.n/Vth$, making use of the weight mean ā obtained in the preceding step (2).

(4) To make the evaluation of the characteristic from the value of the parameter K2, making use of, for example, the data in Table 3.

In the foregoing description of the first and second embodiments of the invention, the rate of reduction of the pressure $\eta_p$ is used as the index of the effect of the refrigerating power control. This is because the use of this index makes it possible to evaluate the effect of the refrigerating power control solely by the ratio ΔP/Ps of the suction pressure Ps to the pressure reduction ΔP.

However, more strictly, the rate of reduction of the refrigerating power can be obtained from the specific weight of the refrigerant at the suction side and that in the vane chamber. Namely, representing the specific weight of the refrigerant at the suction side by $\gamma_A$ and that of the refrigerant in the vane chamber by $\gamma_a$, while expressing the specific weight of the refrigerant in the vane chamber at the instant of completion of the suction stroke by $\gamma_a=\gamma_{as}$, the rate $\eta_j$ of reduction of the refrigerating power can be defined as expressed by the following equation (19).

$$\eta_j = \left(1 - \frac{\gamma_{as}}{\gamma_A}\right) \times 100 \quad (19)$$

Assuming here that the refrigerant temperature at the instant of completion of the suction stroke is given by Ta=Tas, the equation (19) can be transformed into the following equation (20), because there is a relation expressed by γ=P/RT.

$$\eta_j = \left(1 - \frac{P_{as}}{P_A} \cdot \frac{T_A}{T_{as}}\right) \times 100 \quad (20)$$

The refrigerant temperature Ta in the vane chamber can be determined as follows.

In the energy equation (1) mentioned before, representing the total weight $G_o$ of refrigerant in the vane chamber by $G_o = \gamma_a \cdot V_a$, and assuming that the conditions of $Ta = T_A$ and $dQ/dt = 0$ are obtained at the instant $t = 0$, the following equation (21) is derived.

$$C_p T_A \int_o^t G dt - A \int_o^t P_a dV_a = C_v G_o (T_a - T_A) \quad (21)$$

The equation (21) was solved under the conditions given in Tables 1 and 2, on the assumption of $A = 1/42700$ Kcal/Kg.cm, $Cp = 0.147$ Kcal/Kg°K. and $Cv = 0.130$ Kcal/Kg°K., to determine the transient characteristic of the refrigerant temperature Ta in the vane chamber.

The change of the refrigerant temperature Ta is gentle as compared with the change of the pressure in the vane chamber (See FIG. 9) obtained under the same condition, and the offset of the refrigerant temperature from that of the suction side $T_A$ is rather small. The difference of the final refrigerant temperature caused by the difference of the rotation speed is within an order of 5° C. to 12° C. at the greatest, and the rate of change of temperature $T_A/T_{as}$ is as small as 1.09 to 1.14. It will be understood that the rate $\eta_j$ of reduction of refrigerating power is determined almost completely by the ratio $P_{as}/P_s$ of refrigerant pressure or by the rate of pressure reduction, $\eta_p = 1 - P_{as}/P_s$. From the above consideration, it will be understood that the effect on the refrigerating power control can be evaluated solely from the rate $\eta_p$ of pressure reduction.

Preferred embodiments of the invention applied sliding vane type compressor having two vanes have been described. It is to be understood, however, that the invention can be applied to various types of compressors irrespective of the displacement, number of vanes and other factors. Although a larger displacement can be obtained by mounting the vanes at an eccentricity from the center of the rotor, such an eccentric arrangement is not essential and the invention can be applied to sliding vane type compressors having vane mounted without any eccentricity from the center of the rotor. Also, the constant angular pitch of the disposal of vanes as employed in the described embodiments is not essential, and the invention can be equally applied to sliding vane type compressor having an irregular pitch of the vanes. In such a case, the refrigerating power control of the invention is effected on the vane chamber having the greater value of the maximum suction volume Vo.

The cylinder which has a cylindrical form in the described embodiments can have an oval cross-section. The invention can be applied even to a single-vane type compressor in which a single vane is slidably mounted radially across the rotor. However, this single vane substantially acts as two disposed in the compressor.

As has been described, by constructing the compressor under the condition specified by the present invention, it is possible to effectively suppress the refrigerating power only in the high-speed operation while avoiding substantial reduction of the refrigerating power in the low-speed operation. Thus, the present invention offers an advantage of the refrigerating power control with ordinary rotary compressor having a simple construction, without necessitating addition of any specific auxiliary equipment.

What is claimed is:

1. In a sliding vane type rotary compressor having a rotor, at least one vane slidably mounted on said rotor and said vane, and end plates fixed to both ends of said cylinder so as to close vane chambers defined by said vane, said rotor and said cylinder at both sides of said vane chamber, wherein the improvement comprises that said compressor is constructed to meet the following condition of:

$$0.025 < \theta_s \bar{a}/V_o < 0.080$$

where, $\bar{a}$ is a value given by the following equation of:

$$\bar{a} = \int_o^{\theta_s} \theta^2 a(\theta) d\theta / \int_o^{\theta_s} \theta^2 d\theta$$

$\theta$ represents the angle (radian) formed around the center of rotation of said rotor between the end of said vane closer to said cylinder and the cylinder top where the distance between the inner peripheral surface of said cylinder and the outer peripheral surface of said rotor is smallest;

$\theta_s$ represents said rotation angle $\theta$ (radian) at the instant of completion of the suction stroke;

Vo represents the volume (cc) of said vane chamber when said rotation angle $\theta$ is $\theta_s$; and $a(\theta)$ represents the effective area (cm²) of the suction passage between an evaporator and said vane chamber.

2. A compressor as claimed in claim 1, wherein said $\theta_s$ radian, Vo and $\bar{a}$ are selected to meet the following condition:

$$0.035 < \theta_s \bar{a}/V_o < 0.070.$$

3. A compressor as claimed in claim 1, wherein said $\theta_s$ radian, Vo and $\bar{a}$ are selected to meet the following condition:

$$0.040 < \theta_s \bar{a}/V_o < 0.065.$$

* * * * *

UNITED STATES PATENT AND TRADEMARK OFFICE
CERTIFICATE OF CORRECTION

PATENT NO. : 4,415,320

DATED : November 15, 1983

INVENTOR(S) : Teruo Maruyama et al

It is certified that error appears in the above—identified patent and that said Letters Patent are hereby corrected as shown below:

On the title page

At "[30] Foreign Application Priority Data", change "55-13048" to -- 55-134048 --.

Signed and Sealed this

Ninth Day of October 1984

[SEAL]

Attest:

GERALD J. MOSSINGHOFF

Attesting Officer

Commissioner of Patents and Trademarks